(12) United States Patent
Wangler et al.

(10) Patent No.: US 9,046,392 B2
(45) Date of Patent: Jun. 2, 2015

(54) DISPLACEMENT MEASURING APPARATUS

(75) Inventors: Jochen Wangler, Stuttgart (DE); Gerd Eckel, Wendlingen (DE)

(73) Assignee: BALLUFF GmbH, Neuhausen (DE)

( * ) Notice: Subject to any disclaimer, the term of this patent is extended or adjusted under 35 U.S.C. 154(b) by 790 days.

(21) Appl. No.: 12/380,017

(22) Filed: Feb. 19, 2009

(65) Prior Publication Data

US 2010/0097050 A1    Apr. 22, 2010

(30) Foreign Application Priority Data

Oct. 17, 2008 (DE) .................... 20 2008 014 347 U (51) Int. Cl.
*G01B 7/14* (2006.01)
*G01D 11/24* (2006.01)

(52) U.S. Cl.
CPC .................................. *G01D 11/245* (2013.01)

(58) Field of Classification Search
CPC ........ G01B 7/14; G01B 7/003; G01D 11/245; G01D 5/48; G01D 5/485; G01L 3/00
USPC .................. 324/207.23, 207.24, 209, 207.11, 324/207.12, 207.13, 207.15
See application file for complete search history.

(56) References Cited

U.S. PATENT DOCUMENTS

| | | |
|---|---|---|
| 3,898,555 A | 8/1975 | Tellerman |
| 4,643,508 A | 2/1987 | Schaller |
| 4,865,281 A | 9/1989 | Wollar |
| 4,952,873 A | 8/1990 | Tellerman |
| 5,136,884 A | 8/1992 | Lovett |
| 5,313,160 A | 5/1994 | Gloden et al. |
| 5,514,961 A | 5/1996 | Stoll et al. |
| 5,736,855 A | 4/1998 | Smith et al. |
| 5,903,426 A | 5/1999 | Ehling |
| 5,923,164 A | 7/1999 | Ehling et al. |
| 6,243,928 B1 | 6/2001 | Powell |
| 6,307,752 B1 * | 10/2001 | Howard et al. ............... 361/752 |
| 6,356,071 B1 | 3/2002 | Koski et al. |
| 6,903,544 B2 | 6/2005 | Kurz et al. |

(Continued)

FOREIGN PATENT DOCUMENTS

| | | |
|---|---|---|
| DE | 31 15 587 | 11/1982 |
| DE | 32 03 520 | 8/1983 |

(Continued)

OTHER PUBLICATIONS

Burkhardt, Thomas et al., "Lineare Weg-und Abstandssensoren," Verlag Moderne Industrie, Die Bibliothek der Technik, vol. 271, Munich 2004, chapter "Magnetostriktive Wegsonsoren."

(Continued)

*Primary Examiner* — Tung X Nguyen
*Assistant Examiner* — Son Le
(74) *Attorney, Agent, or Firm* — Lipsitz & McAllister, LLC (57) ABSTRACT

A displacement measuring apparatus is provided, which comprises a measuring sensor, a housing, a first board, a second board and a third board, which boards are arranged in the housing and are circuit carriers, wherein the second board and the third board are in each case oriented transversely to the first board, the second board and the third board are connected by means of a first plug-in connection device and the combination of the second board and third board is connected to the first board by means of a second plug-in connection device.

22 Claims, 6 Drawing Sheets

(56) References Cited

U.S. PATENT DOCUMENTS

| | | | |
|---|---|---|---|
| 7,071,680 | B2 | 7/2006 | Kurz et al. |
| 2002/0135359 | A1* | 9/2002 | Steinich .................. 324/207.13 |
| 2003/0076089 | A1* | 4/2003 | Kurz et al. ............... 324/207.13 |
| 2003/0205084 | A1* | 11/2003 | Ludwig ...................... 73/152.43 |
| 2004/0252456 | A1* | 12/2004 | Larson et al. ................. 361/694 |
| 2005/0174108 | A1 | 8/2005 | Kurz et al. |
| 2006/0202640 | A1* | 9/2006 | Alexandrov .................. 315/291 |
| 2006/0278023 | A1* | 12/2006 | Garneyer et al. ........ 73/862.333 |

FOREIGN PATENT DOCUMENTS

| | | |
|---|---|---|
| DE | 41 16 651 | 1/1992 |
| DE | 42 44 204 | 6/1994 |
| DE | 43 06 539 | 9/1994 |
| DE | 43 06 951 | 9/1994 |
| DE | 43 34 811 | 4/1995 |
| DE | 691 03 441 | 4/1995 |
| DE | 195 04 608 | 8/1996 |
| DE | 196 53 222 | 7/1998 |
| DE | 297 04 780 | 8/1998 |
| DE | 298 11 117 | 11/1998 |
| DE | 199 17 312 | 10/1999 |
| DE | 198 32 533 | 11/1999 |
| EP | 0 471 073 | 2/1992 |
| EP | 0 366 227 | 9/1994 |
| EP | 0 987 521 | 3/2000 |
| EP | 1 306 650 | 5/2003 |
| EP | 1 306 651 | 5/2003 |
| FR | 2 749 384 | 12/1997 |

OTHER PUBLICATIONS

Ametek, Inc., "Series 952 Gemco BlueOX LDT with Quadrature Output" specification sheet, AMETEK Patriot Sensors, 2 pages, date unknown.
MTS Sensor Technologie GmbH & Co. KG, brochure entitled "Die magnetostriktiven Positionssensoren", 6 pages, Apr. 2001.
Balluff GmbH, brochure entitled Micropulse Wegaufnehmer BTL, 2 pages, date unknown.
Gefran spa, information sheet entitled "PZ12 Rectilinear Displacement Transducer With Cylindrical Case", 3 pages, Oct. 1999.
Gefran spa, information sheet entitled "PC Linearpotentiometer", 2 pages, Jul. 2003.
Gefran spa, information sheet entitled "PZ12 Linearpotentiometer im zylindrischem Gehaeuse", 2 pages, Jul. 2003.
Gefran spa, catalog "Wegaufnehmer, Drehgeber", 6 pages, Jan. 2000.
Patent Abstracts of Japan, JP 60031013, Position Sensor Wherein Magnetoresistance Body is Used, Publication Date Feb. 16, 1985.
Patent Abstracts of Japan, JP 60031014, Position Sensor Wherein Magnetoresistance Body is Used, Publication Date Feb. 16, 1985.
Patent Abstracts of Japan, JP 60031015, Position Sensor Wherein Magnetoresistance Body is Used, Publication Date Feb. 16, 1985.
Gefran spa, catalog, "Sensors Catalog", 64 pages, Oct. 1999.
Product sheet of Gefran spa, "Betriebs- und Wartungsanleitung fur Massedruckaufnehmer zum Einsatz bei Hochtemperaturen", 4 pages, Feb. 25, 1997.
Santest Co., Ltd. brochure, "Linear Profile Version GY Series—Model GYKM", 4 pages, publication date unknown.
Six photographs of a transducer manufactured by Balluff GmbH, 6 pages, Jul. 1998.
Balluff GmbH catalogue, "Balluff Edition F", 6 pages, Jul. 1998.
Patents Abstracts of Japan, "Displacement Detector", Publication No. 08285563, Nov. 1, 1996.

* cited by examiner

DISPLACEMENT MEASURING APPARATUS

The present disclosure relates to the subject matter disclosed in German application number 20 2008 014 347.0 of Oct. 17, 2008, which is incorporated herein by reference in its entirety and for all purposes.

BACKGROUND OF THE INVENTION

The invention relates to a displacement measuring apparatus with a measuring sensor and a housing.

Displacement measuring apparatus of this kind are used in order, for example, to detect the displacement or the position of a movable machine element to which a position sensor is coupled.

For example, transsonar displacement transducer devices are known in which the position sensor is a permanent magnet or an electromagnet and the displacement is determined by measuring the propagation time of propagating mechanical waves on a waveguide of the measuring sensor.

EP 1 306 651 A1 and US 2005/0174108 A1 disclose displacement transducer devices for detecting the displacement of a position sensor which comprise a housing extending in a longitudinal direction, a measuring sensor which is arranged in the housing, extends parallel to the longitudinal direction and to which the position sensor is coupled in contactless manner, and an electrical connection element arranged on the housing.

SUMMARY OF THE INVENTION

In accordance with the present invention, a displacement measuring apparatus is provided, which is of modular structure and can be produced in a simple manner.

In accordance with an embodiment of the invention, the displacement measuring apparatus comprises a first board, a second board and a third board, which boards are arranged in the housing and are circuit carriers, wherein the second board and the third board are in each case oriented transversely to the first board, the second board and the third board are connected by means of a first plug-in connection device and the combination of the second board and third board is connected to the first board by means of a second plug-in connection device.

When producing the displacement measuring apparatus the second board and the third board can be electrically and mechanically connected together by means of the plug-in connection device. This combination can then be electrically and mechanically coupled to the first board with the second plug-in connection device. The mechanical and electrical connection takes place by simply plugging in the boards. This can be carried out quickly and no conductor cords are required.

The second plug-in connection device establishes a plug-in connection of the second board and/or the third board to the first board.

By providing a plurality of boards, when arranging the circuit components these can be distributed among different boards and separation which is optimised for production and function can as a result be achieved.

One board is in particular formed as a power supply device board. A further board is formed as a measurement interface device. The first board is formed, for example, as a communication device for communicating with the outside world. It is then possible, for example, to use the same power supply device board for a plurality of differently formed displacement measuring devices, which board can be connected to different measurement interface device boards.

It is also possible to repair or replace circuit components in a simple manner.

A mechanically stable structure, which can be produced in a simple manner, is also obtained through the arrangement with the second board and the third board, which support one another by means of the first plug-in connection device, and by positioning this combination on the first board.

The second board and the third board are in particular oriented at least approximately parallel to one another. The second board and the third board are spaced apart from one another. This results in an "ordered" structure for the electronic components inside the housing. The interspace between the second board and the third board can be used to position a part of the measuring sensor.

It is also advantageous for the second board and/or the third board to be oriented at least approximately perpendicularly to the first board. This results in a simple and clearly arranged structure. The electrical and mechanical connection can be achieved in a simple manner.

A housing cover on which an electrical connection device is arranged is advantageously provided. By means of this electrical connection device the displacement measuring apparatus can be provided with electric current and measuring signals can be delivered and control signals supplied. The electrical connection device comprises, for example, a plug connection or a cable connection.

It is advantageous to electrically connect the first board directly to the first connection device and, for example, to solder it thereto. Corresponding circuit components on the first board then form a communication interface for communicating with the outside world, including power supply and signal output and/or signal input.

The first board is advantageously arranged on a housing cover. This board can as a result be fixed in a simple manner. It is then also possible to fix the second board and the third board to the housing cover inside the housing in a simple manner by means of the second plug-in connection device, with the possibility of also providing an additional securing mechanism, for example by means of a screwed connection.

In one embodiment at least one holding pin is arranged on the housing cover, on which pin the first board is seated. The at least one holding pin is pressed into the housing cover, for example. The first board is seated on the housing cover, while the at least one holding pin is passed through a recess in the board. The board is then soldered to the at least one holding pin, for example.

It is particularly advantageous for the first plug-in connection device and the second plug-in connection device, respectively, to provide an electrical and mechanical connection. Production is as a result greatly simplified. For example, no conductor cords have to be provided and no soldering processes are necessary in order to connect the first board to the second board and the third board (both mechanically and electrically).

The first plug-in connection device and the second plug-in connection device advantageously in each case comprise at least one pin element with a plurality of contact pins and a mating element associated with the respective pin element with recesses for accommodating the contact pins. A multipolar plug connection is thereby provided. In this respect the pin element is arranged on one board and the mating element on the other board when the one board and the other board are connected together.

It is likewise advantageous for a first region of the measuring sensor to extend into an interspace between the second board and the third board. It is thereby possible to electrically connect the measuring sensor to the second board or third board in a simple manner. A compact structure is also achieved.

In one embodiment the measuring sensor comprises a measuring sensor housing which is arranged on the housing for the boards. The measuring sensor can as a result be fixed in a simple manner. Generally speaking, however, it is also possible for the measuring sensor to be integrated into a common housing with the boards.

The measuring sensor is in particular electrically connected to the second board and/or third board. A power supply and signal exchange can as a result be achieved in a simple manner.

In one embodiment the measuring sensor is at least electrically connected to the second board and/or third board by means of a third plug-in connection device. For example, the third plug in connection device comprises a plug connector which is electrically connected to the measuring sensor by means of a film conductor. It is as a result easily possible to replace the measuring sensor or the second board or third board.

It is particularly advantageous for the boards with the corresponding circuit components to have separate functions. The second board advantageously carries a power supply device ("power board"). The board carries components such as, for example, a DC-DC converter, which provides the voltage optimised for operating the displacement measuring apparatus. Overheating of electronic components which are carried by the third board can be prevented by means of an interspace between the second board and the third board.

It is also of advantage for the second board to carry a measuring sensor communication device. Signals for triggering measuring signals are then preferably transmitted to the measuring sensor by means of circuit components of the second board and measuring signals are received by the second board and relayed to the third board. Preprocessing such as, for example, amplification or preamplification can take place at the second board.

It is advantageous for the third board to carry a signal evaluation device. Signal processing can be carried out here. Appropriately processed measuring signals can then in particular be delivered to the exterior. The circuit components of the third board in particular form a measurement interface device which is responsible for triggering a measurement and the evaluation of measuring signals and corresponding shaping of measuring signals.

It is advantageous for the first board to carry a display device. The display device comprises, for example, one or a plurality of light-emitting diode(s). A user can thereby identify an operating state or a fault or programming state of the displacement measuring apparatus. In this respect a housing cover is preferably formed so that the display device can be distinguished from outside.

It is also advantageous for the first board to carry an EMC filter device. The filter device can as a result be positioned in an optimised manner with a short earthing connection with respect to a housing cover.

It is also possible for the first board to carry a parameterisation device, at least in part. Parameterisation is possible from outside by means of a magnetic probe, for example. The parameterisation device can, for example, comprise one or a plurality of magnetic field sensor(s) which can identify probe positions.

It is possible for the second board and/or third board to be (additionally) screwed to a housing cover. This results in high mechanical stability of the arrangement of the boards in a housing interior of the housing.

It is particularly advantageous for a surrounding collar, which projects into a housing interior, to be arranged on a housing cover. This results in high EMC tightness and, for example, there is as a result no longer any need for conductive seals in order to seal the housing cover off from a housing wall.

For the same reason it is advantageous for a surrounding collar, which projects into a housing interior, to be arranged on a flange, which holds the measuring sensor and/or through which the measuring sensor passes.

The displacement measuring apparatus is in particular configured as a magnetostrictive displacement measuring apparatus. EP 1 306 651 A1 and EP 1 306 650 A1 or US 2005/0174108 A1 and the above-mentioned book "Lineare Weg- und Abstandssensoren" ("Linear displacement and distance sensors") are to be referred to in this respect.

In this case the measuring sensor comprises a waveguide for an elastic wave which is in particular a transsonar wave.

At least one magnet is advantageously provided as the position sensor, the position of the position sensor being determinable.

Generally speaking, it is possible for either just the second board to be connected to the first board by means of a plug-in connection or just the third board to be connected to the first board by means of a plug-in connection. In one preferred embodiment the second plug-in connection device comprises a first sub-unit by means of which the second board is connected to the first board, and a second sub-unit by means of which the third board is connected to the first board. This results in a mechanically stable structure. Electrical conduction paths can be kept short, as electronic components both on the second board and on the third board can be directly coupled to electronic components on the first board.

In conjunction with the drawings, the following description of preferred embodiments serves to illustrate the invention in detail.

DETAILED DESCRIPTION OF THE INVENTION

An embodiment of a displacement measuring apparatus according to the invention, which is shown and indicated by 10 in FIGS. 1 to 6, comprises a measuring device which is indicated as a whole by 12. The measuring device 12 is usually fixed in a stationary manner to an application. The displacement measuring apparatus 10 also comprises a position sensor 14 which is movable and, for example, displaceable. This is indicated by a double arrow with the reference number 16 in FIG. 1.

In one embodiment the displacement measuring apparatus 10 is configured as a magnetostrictive displacement measuring apparatus. In this case the position sensor 14 is a magnet 18 and in particular a permanent magnet.

The measuring device 12 comprises a housing 20 which defines a housing interior 22. The housing 20 has a housing wall 23 which is oriented parallel to a longitudinal direction 24 of the measuring device 12. The housing 20 has, for example, a cylindrical, cuboidal or another polygonal outer contour.

The housing 20 is closed at a rear end by a housing cover 26. At a front end lying opposite this end the housing 20 is closed by means of a flange 28. The flange 28 holds a measuring sensor 30 which defines a measuring path for measuring the position/displacement of the position sensor 14 along this measuring path.

The measuring sensor 30 comprises a measuring sensor housing 32 which is connected to the flange 28. A waveguide 34 is arranged in the measuring sensor housing 32. This waveguide 34 is of tubular formation or in the form of wire, for example. It is made of a nickel-iron alloy, for example. A copper conductor is threaded into it.

In a magnetostrictive displacement measuring apparatus an exciting current pulse coming from a measurement interface triggers a measurement. The exciting current pulse is in turn triggered by means of a start signal. The exciting current pulse generates a circular magnetic field which, on account of soft magnetic properties of the waveguide 34, is concentrated therein. The position sensor 14 is arranged at a measuring point of the waveguide. The magnetic lines of force thereof extend at a right angle to the circular magnetic field and are concentrated in the waveguide 34.

Elastic deformation occurs on account of magnetostriction in the microrange of the structure of the waveguide 34 in a region in which the two magnetic fields are superimposed. This elastic deformation in turn gives rise to an elastic wave propagating along the waveguide 34 in opposite directions. The propagation speed of this wave in the waveguide 34 is of the order of magnitude of approximately 2800 m/s and is largely immune to environmental influences.

A damping member 38 is provided at one end 37 of the waveguide 34 for damping away the transsonar wave travelling to this end 37. The component which is reflected back is thereby negligible upon signal detection when compared with the directly propagating wave.

A signal converter (see below) is associated with the waveguide 36, which converter generates an electrical signal through a reversal of the magnetostrictive effect and magnetic induction and delivers this to the measurement interface.

The wave propagation time from the point of origin to the signal converter is directly proportional to the distance between the position sensor 14 and the signal converter. The distance between the signal converter and the position sensor 14 can therefore be determined with a high degree of accuracy by means of a time measurement. The primary measuring signal for the time measurement is the exciting current pulse on the waveguide 34 and its reaction pulse, which is delivered by the signal converter to the measurement interface in a time-displaced manner as a function of the distance between the signal converter and the position sensor 14.

EP 1 306 650 A1 or US 2005/0174108 A1 and the chapter "Magnetostriktive Wegsensoren" ("Magnetostrictive displacement sensors") in "Lineare Weg-und Abstandssensoren" ("Linear displacement and distance sensors"), Thomas Burkhardt, Albert Feinaugle, Sorin Fericean, Alexander Forkl, Verlag moderne Industrie, Die Bibliothek der Technik Volume 271, Munich 2004 are referred to with regard to the mode of operation of a magnetostrictive displacement measuring system.

Electronic components of the measuring device 12 are arranged in the housing interior 22. For this purpose a first board 42 is positioned on the inside 40 of the housing cover 26. On its inside the housing cover 26 has holding pins 44 which, for example, are pressed in. The first board 42 has corresponding recesses 46, through which the holding pins 44 respectively pass. The first board 42 is soldered to the holding pins 44 and therefore fixed to the inside 40 of the housing cover 26.

An electrical connection device 48 is arranged on the housing cover 26, which device is in particular formed as a plug connection 50. By means of this plug connection 50 the measuring device 12 can be supplied with power, and signals can optionally be coupled in. Measuring signals can be tapped off by means of the plug connection 50.

The electrical connection device 48 is electrically connected to the first board 42. For this purpose corresponding contact elements of the electrical connection device 48 are in particular directly connected and in particular soldered to the first board 42. The first board 42 is an element by means of which the measuring device 12 communicates with the outside world.

The first board 42 is formed in a plate-shaped and in particular flat manner and with an at least approximately plane top side 52*a* and an at least approximately plane underside 52*b*, the top side 52*a* and the underside 52*b* being parallel to one another. The first board 42 is oriented transversely and in particular perpendicularly to the longitudinal direction 24.

The first board 42 is a circuit carrier and carries further electrical elements.

The first board 42 carries in particular one or more light-emitting diode(s) which is/are arranged so that it/they can be observed externally of the measuring device 12. (The light-emitting diodes are not shown in the Figures). The housing cover 26 has corresponding windows, so that these displays are visible from outside. The at least one light-emitting diode displays an operating state or a fault of the displacement measuring apparatus 10.

The at least one light-emitting diode can also serve to display programming steps or parameterisations when programming or parameterising the displacement measuring apparatus 10.

The first board 42 also carries an EMC filter device, in particular for the power supply of the measuring device 12.

It is also possible for the first board 42 to hold one or a plurality of sensor(s) 54 such as, for example, Hall sensors. Parameterisation of the measuring device 12 can be carried out by means of these Hall sensors. For this purpose, for example, a probe with a magnetic active area is arranged opposite a sensor 54 on the housing cover 26. By operating the probe, the magnetic field action on a corresponding Hall sensor 54 can be varied and parameterisation thereby carried out.

A second board 56 and a third board 58 are also arranged in the housing interior 22. The second board 56 and the third board 58 are likewise formed in a plate-shaped manner with substantially plane top sides and undersides which are oriented parallel to one another.

The second board 56 and the third board 58 are spaced apart in a direction transverse to the longitudinal direction 54 with an interspace 60 between the second board 56 and the third board 58. The second board 56 and the third board 58 are oriented at least approximately parallel to one another and lie parallel to the longitudinal direction 24.

The second board 56 and the third board 58 in each case lie transversely and in particular perpendicularly to the first board 42.

The second board 56 and the third board 58 are electrically and mechanically connected together by means of a first plug-in connection device 62. The first plug-in connection device 62 connects and positions the second board 56 and the third board 58 in a direction transverse to the longitudinal direction 24. The second board 56 and the third board 58 are supported against one another in this direction by means of the first plug-in connection device 62.

The first plug-in connection device 62 is multipolar and comprises a pin element 64 having a plurality of contact pins 66. In the illustrated embodiment the pin element 64 is arranged on the second board 56. However it can also be arranged on the third board 58.

A mating element 68, which is arranged on the other board, is associated with this pin element 64. In the illustrated embodiment the mating element 68 is fixed to the third board 58. This mating element 68 has recesses which are associated with the contact pins 66 and into which the contact pins 66 project.

The connection between the second board 56 and the third board 58 is established by inserting the contact pins 66 of the pin element 64 in the recesses of the mating element 68 in a plug-in direction.

The contact pins 66 are arranged in at least one row; the recesses of the mating element 68 are accordingly arranged in a row. It is thereby possible to fix and support the second board 56 and the third board 58 against one another over a relatively large area.

The second board 56 and the third board 58 and therefore the combination of the second board 56 and the third board 58 are electrically and mechanically connected to the first board 42 by means of a second plug-in connection device 70, the second board 56 and the third board 58 in each case being connected with sub-units 70' and 70" of the plug-in connection device 70 to the first board 42. A plug-in direction of the first plug-in connection device 62 lies transversely and in particular perpendicularly to the longitudinal direction 24. A plug-in direction of the second plug-in connection device 70 lies parallel to the longitudinal direction 24. The second plug-in connection device 70 in turn comprises a pin element which is arranged on the third board 58 and a mating element 72 which is arranged on the first board 42.

The second board 56 is additionally screwed to the housing cover 26 by means of a screw-on dome 74 and the third board 58 is additionally screwed to the housing cover 26 by means of a screw-on dome 76.

A first region 78 of the measuring sensor 30 projects into the interspace 60 between the second board 56 and the third board 58. The above-mentioned signal converter (indicated by the reference number 80 in FIG. 1) is arranged in this first region 78, for example.

The measuring sensor 30 is electrically connected to the second board 56 by means of a third plug-in connection device 82, for example. The measuring sensor 30 is mechanically held on the flange 28. The third plug-in connection device 82 comprises, for example, a plug connector 84 which is fixed to a mating plug connector 86, the mating plug connector 86 being arranged on the second board 56. The plug connector 84 is connected to the measuring sensor 30 by means of a film conductor 88, for example. The film conductor 88 can also be directly (releasably) inserted with its contacts in a mating element on the second board 56.

Figure 1:
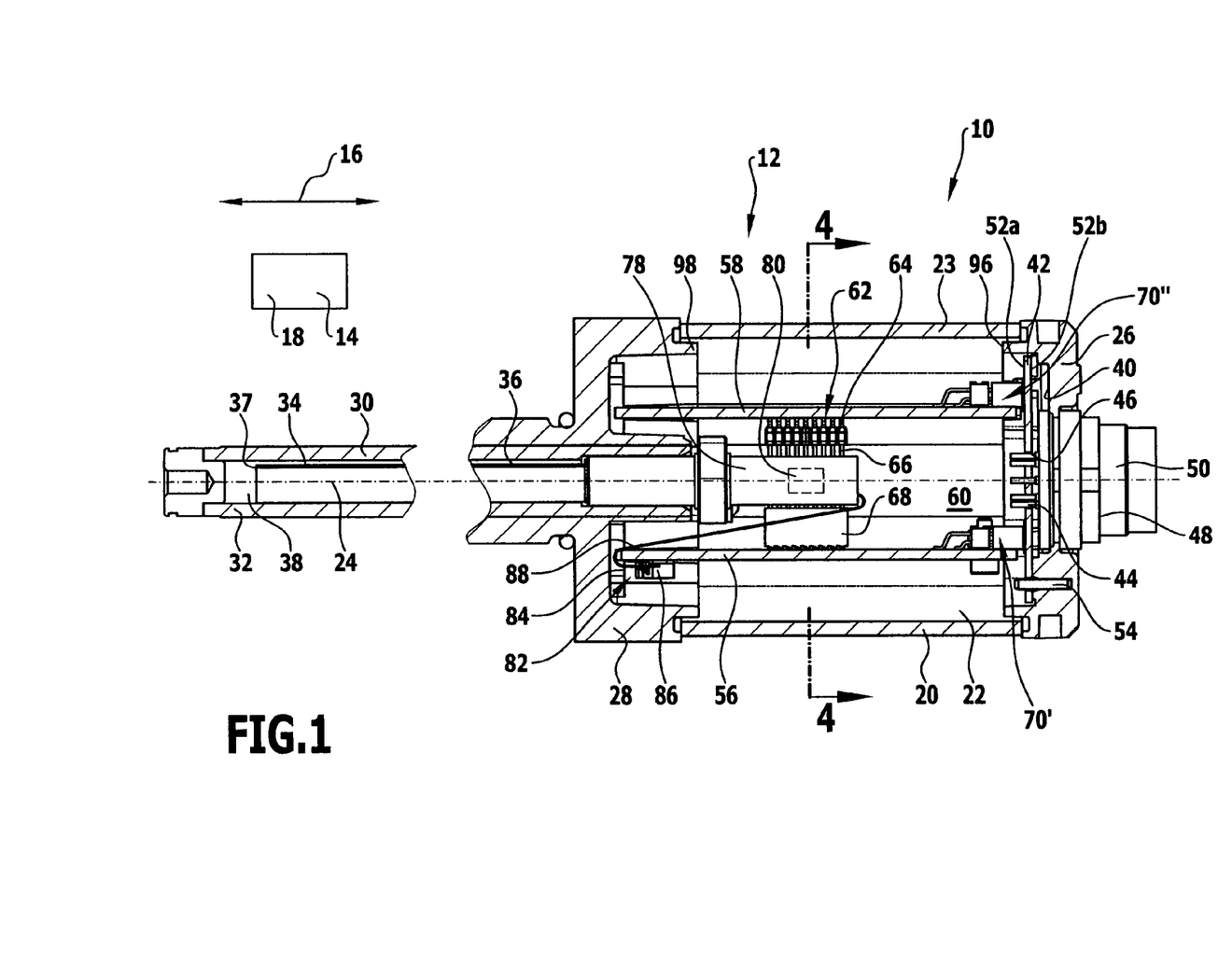
FIG. 1 is a sectional view of an embodiment of a displacement measuring apparatus according to the invention.
Figure 2:
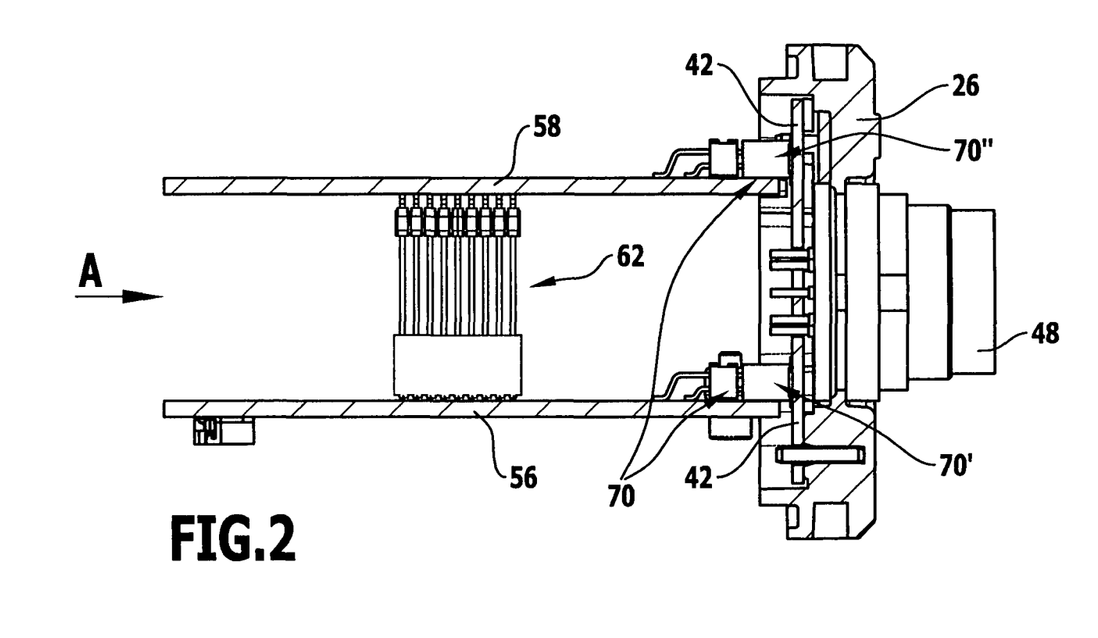
FIG. 2 is a partial view of the displacement measuring apparatus according to FIG. 1.
Figure 3:
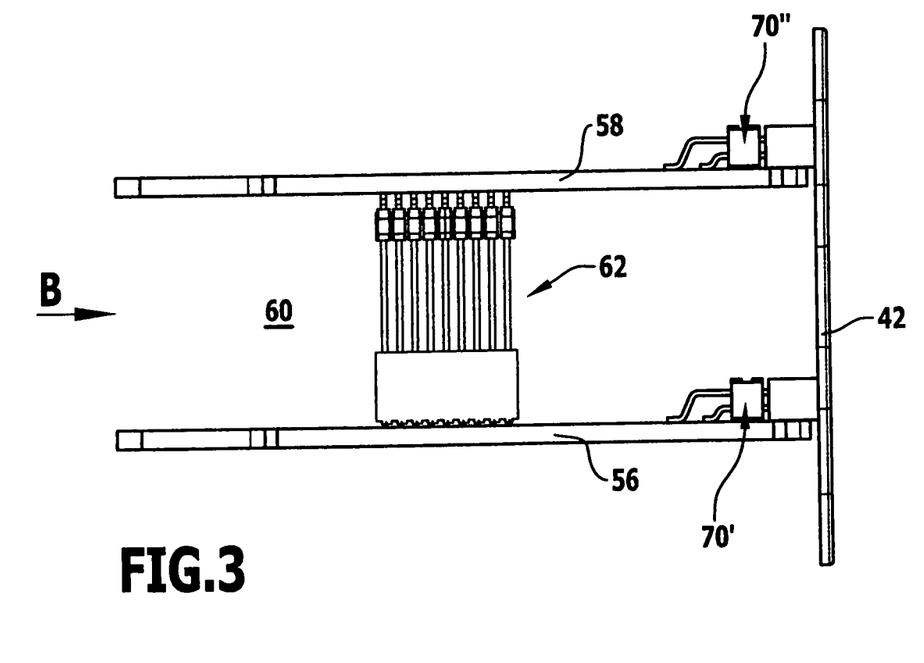
FIG. 3 is a further partial view of the displacement measuring apparatus according to FIG. 1.
Figure 4:
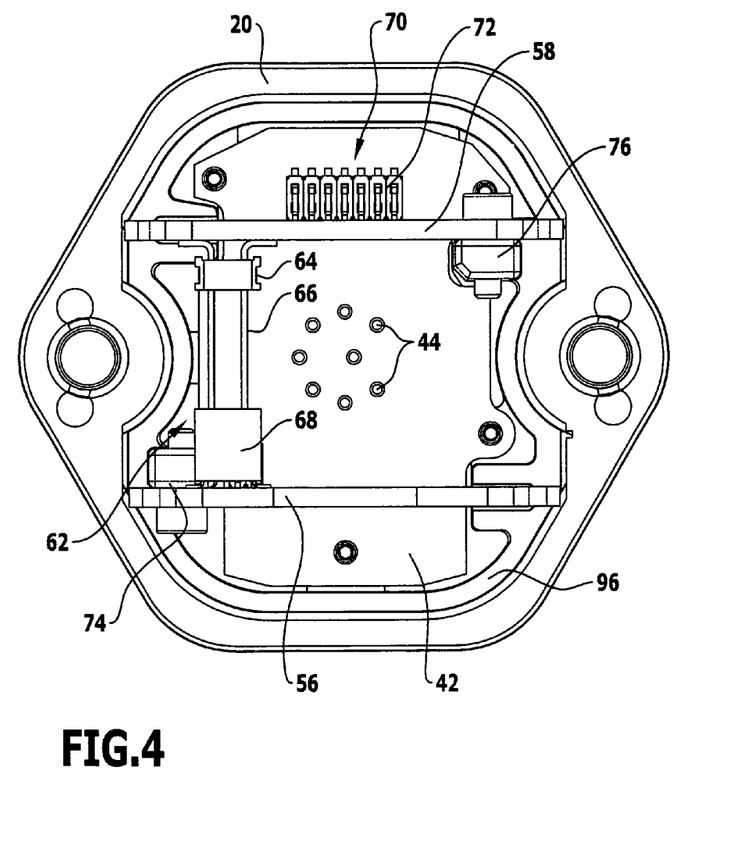
FIG. 4 is a sectional view along the line 4-4 according to FIG. 1.
Figure 5:
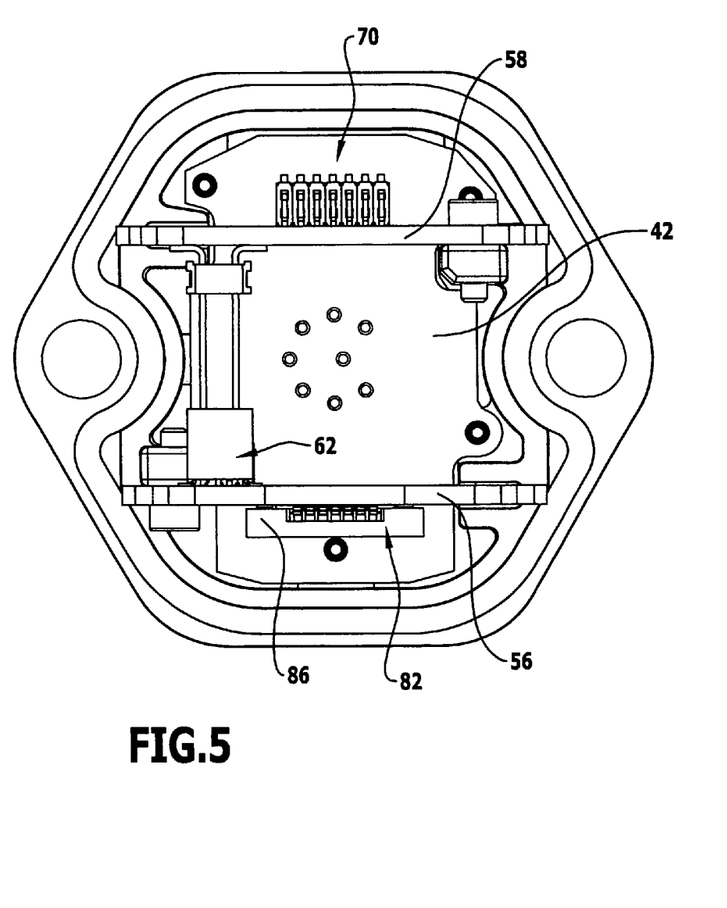
FIG. 5 is a view along the direction A according to FIG. 2.
Figure 6:
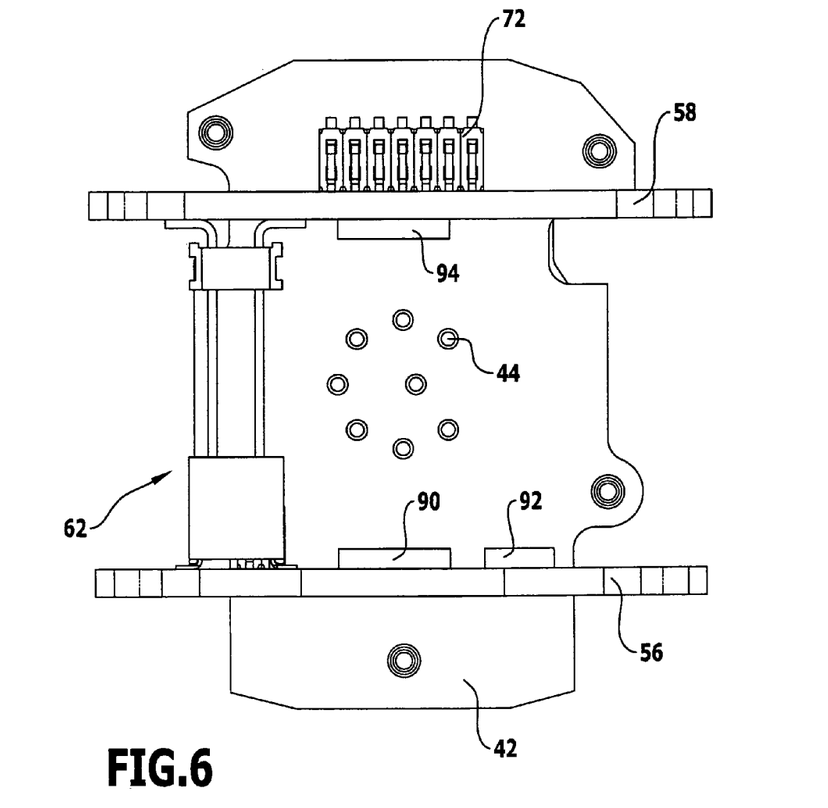
FIG. 6 is a view along the direction B according to FIG. 3.

The second board 56 carries an (internal) power supply device 90 for the measuring device 12 (FIG. 6). Electrical power is coupled into the measuring device 12 by means of the electrical connection device 48, the corresponding current then flowing from the first board 42 via the third board 58 to the second board 56.

The second board 56 also carries an electrical measuring sensor communication device 92 which is responsible for direct electrical communication with the measuring sensor 30. The measuring sensor communication device 92 comprises a measuring sensor power supply, an activation device for the measuring sensor 30 and a device for (pre)amplification of measuring signals of the measuring sensor 30 before these are supplied to a signal evaluation device 94.

The second board 56 is a "power board".

The third board 58 carries the actual measurement interface device. The signal evaluation device 94 is arranged on this. Signal processing and signal output take place in the signal evaluation device 94.

An internal manufacturing interface, for example, is also arranged on the third board 58.

The corresponding electronic components which provide an exciting current pulse for triggering a measuring signal are arranged on the third board 58 and in particular integrated into the signal evaluation device 94.

The housing cover 26 has a surrounding collar 96 which projects into the housing interior 22 when the housing cover 26 is fixed. EMC tightness is thereby increased.

The flange 26 accordingly has a surrounding collar 98 which likewise projects into the housing interior 22. The collars 96 and 98 preferably lie against the housing wall 23 on the inside.

The solution according to the invention with the assembled boards 56 and 58, wherein this combination is in turn fitted on the first board 42, produces a modular structure of the measuring device 12, which facilitates production and repair.

The combination of the boards 56, 58 and 42 can be achieved by "simply" plugging the respective boards into one another without conductor cords and as a result quickly carried out.

Both a mechanical connection and an electrical connection can be established through the plug-in connection devices 62 and 70.

It is possible, for example, for the same type of board, such as, for example, the "power board" 56, to be used for different types of measuring devices 12 and then, depending on the type of measuring device 12, for the third board 58 and/or the first board 42 to be selected accordingly. For this purpose the second board 56 is in particular configured so that it can be combined with different third boards 58 (boards equipped with different electronic components). The first board 42 is selected by means of the corresponding configuration of the electrical connection device 48.

The positioning of the EMC filter device on the first board 42 results in a short earthing connection with respect to the housing cover, so that optimal positioning is achieved here.

An optimised conductor track run can be obtained on the first board 42; the conductor tracks are always laid in the same way and no undefined conductor cord laying has to take place.

An optimised capacitive coupling between the flange 28 and the housing wall 23 and between the housing cover 26 and the housing wall 23 is obtained through the surrounding collars 96 and 98. This means that conductive seals are no longer necessary.

By positioning appropriate display devices on the first board 42, operating states can be displayed, while the measuring device 12 can be easily produced, and corresponding display support can also be obtained when programming.

The measuring device 12 can in particular be programmed by means of a serial interface which can be integrated into the electrical connection device 48.

The plug-in connection devices 62, 70 (with sub-units 70' and 70") and also 82 are multipolar.

The third plug-in connection device 82 guarantees mechanical modularity of the structure of the measuring device 12. An electronic head and the measuring sensor can be dismounted and replaced independently of one another.

The invention claimed is:

1. Displacement measuring apparatus, comprising:
   a measuring sensor;
   a housing;
   a housing cover closing the housing at a rear end of the housing;
   a first surrounding collar arranged on the housing cover, projecting into a housing interior, and lying directly in contact with a wall of the housing interior, forming a capacitive coupling between the wall of the housing and the housing cover; and
   a first board, a second board and a third board, which boards are arranged in the housing and are circuit carriers;
   a flange arranged at a front end of the housing opposite the rear end of the housing which holds the measuring sensor and/or through which the measuring sensor passes; and
   a second surrounding collar arranged on the flange and projecting into the housing interior, forming a capacitive coupling between the flange and the wall of the housing;
   wherein:
      the second board and the third board are in each case oriented transversely to the first board;
      the second board and the third board are connected by means of a first plug-in connection device; and
      the combination of the second board and third board is connected to the first board by means of a second plug-in connection device;
      the first board is arranged on an inside of the housing cover and is surrounded by the first surrounding collar;
      the first board carries an electromagnetic compatibility (EMC) filter device; and
      at least one of the second board and the third board is screwed to the housing cover.

2. Displacement measuring apparatus according to claim 1, wherein the second board and the third board are oriented at least approximately parallel to one another.

3. Displacement measuring apparatus according to claim 1, wherein at least one of the second board and the third board are oriented at least approximately perpendicularly to the first board.

4. Displacement measuring apparatus according to claim 1, wherein an electrical connection device is arranged on the housing cover.

5. Displacement measuring apparatus according to claim 4, wherein the first board is directly electrically connected to the electrical connection device.

6. Displacement measuring apparatus according to claim 1, wherein at least one holding pin is arranged on the housing cover, on which pin the first board is seated.

7. Displacement measuring apparatus according to claim 1, wherein the first plug-in connection device provides an electrical and mechanical connection.

8. Displacement measuring apparatus according to claim 1, wherein the second plug-in connection device provides an electrical and mechanical connection.

9. Displacement measuring apparatus according to claim 1, wherein the first plug-in connection device and the second plug-in connection device in each case have at least one pin element with a plurality of contact pins and a mating element associated with the respective pin element with recesses for accommodating the contact pins.

10. Displacement measuring apparatus according to claim 1, wherein a first region of the measuring sensor extends into an interspace between the second board and the third board.

11. Displacement measuring apparatus according to claim 1, wherein the measuring sensor comprises a measuring sensor housing which is arranged on the housing for the boards.

12. Displacement measuring apparatus according to claim 1, wherein the measuring sensor is electrically connected to at least one of the second board and third board.

13. Displacement measuring apparatus according to claim 1, wherein the measuring sensor is at least electrically connected to at least one of the second board and third board by means of a third plug-in connection device.

14. Displacement measuring apparatus according to claim 1, wherein the second board carries a power supply device.

15. Displacement measuring apparatus according to claim 1, wherein the second board carries a measuring sensor communication device.

16. Displacement measuring apparatus according to claim 1, wherein the third board carries a signal evaluation device.

17. Displacement measuring apparatus according to claim 1, wherein the first board carries a display device.

18. Displacement measuring apparatus according to claim 1, wherein the first board carries a parameterisation device, at least in part.

19. Displacement measuring apparatus according to claim 1, wherein the displacement measuring apparatus is configured as a magnetostrictive displacement measuring apparatus.

20. Displacement measuring apparatus according to claim 19, wherein the measuring sensor comprises a waveguide for an elastic wave.

21. Displacement measuring apparatus according to claim 1, further comprising at least one magnet as a position sensor.

22. Displacement measuring apparatus according to claim 1, wherein the second plug-in connection device comprises a first sub-unit by means of which the second board is connected to the first board, and a second sub-unit by means of which the third board is connected to the first board.

* * * * *